(12) United States Patent
Freda et al.

(10) Patent No.: US 9,170,153 B2
(45) Date of Patent: Oct. 27, 2015

(54) SPECTROMETER FOR MICROSCOPE ILLUMINATION SOURCES

(71) Applicant: Prior Scientific Instruments, Ltd., Fulbourn, Cambridge (GB)

(72) Inventors: Thomas Freda, Hingham, MA (US); Dennis Doherty, Quincy, MA (US)

(73) Assignee: Prior Scientific Instruments, Ltd., Fulbourn, Cambridge (GB)

( * ) Notice: Subject to any disclaimer, the term of this patent is extended or adjusted under 35 U.S.C. 154(b) by 0 days.

(21) Appl. No.: 14/212,779

(22) Filed: Mar. 14, 2014

(65) Prior Publication Data
US 2014/0268137 A1    Sep. 18, 2014

Related U.S. Application Data

(60) Provisional application No. 61/787,696, filed on Mar. 15, 2013.

(51) Int. Cl.
*G01J 3/28* (2006.01)
*G01J 3/02* (2006.01)
*G02B 21/00* (2006.01)
*G02B 21/06* (2006.01)

(52) U.S. Cl.
CPC ............... *G01J 3/0291* (2013.01); *G01J 3/021* (2013.01); *G01J 3/0202* (2013.01); *G01J 3/0218* (2013.01); *G01J 3/0256* (2013.01); *G02B 21/0096* (2013.01); *G02B 21/06* (2013.01)

(58) Field of Classification Search
CPC .. G01J 3/0218; G01J 3/0291; G02B 21/0096; G02B 21/06
USPC .......................................................... 359/391
See application file for complete search history.

(56) References Cited

U.S. PATENT DOCUMENTS

| 8,135,249 B2 | 3/2012 | Li et al. |
| 2006/0114459 A1* | 6/2006 | Aikawa .......................... 356/328 |
| 2011/0081110 A1* | 4/2011 | Sullivan et al. .................. 385/31 |
| 2011/0081111 A1* | 4/2011 | Li et al. ........................... 385/33 |

* cited by examiner

*Primary Examiner* — Michael A Lyons
*Assistant Examiner* — Violeta A Prieto
(74) *Attorney, Agent, or Firm* — John M. Hammond; Patent Innovations LLC

(57) ABSTRACT

A compact spectrometer apparatus for characterizing a microscope illumination source in real time, and without interfering with the observation and/or characterization of a sample under observation with the microscope. The spectrometer apparatus is comprised of a light probe comprising a mirror disposed in a housing, the mirror positioned to reflect light from the illumination source into an optical coupling; an optical waveguide receiving reflected light into the optical coupling; and a spectrometer comprising a light sensor receiving reflected light directed by the optical waveguide from the optical coupling of the light probe, the sensor adapted to sense light over a range of wavelengths and output a signal indicative of the intensity of the light at any wavelength over the range.

8 Claims, 11 Drawing Sheets

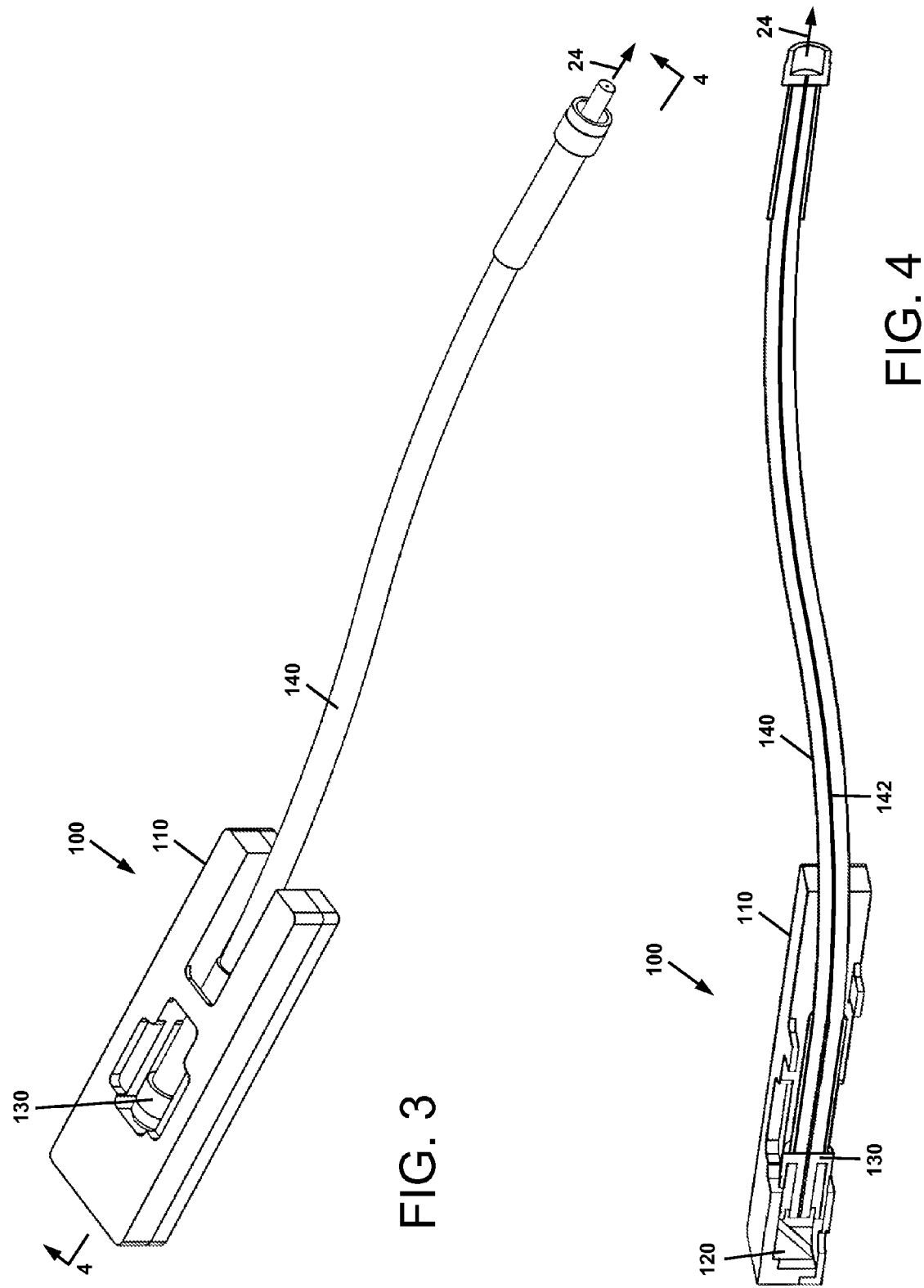

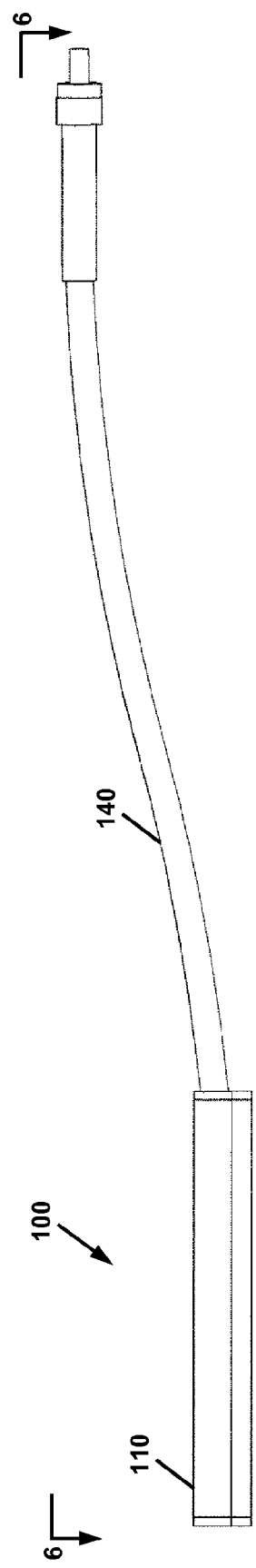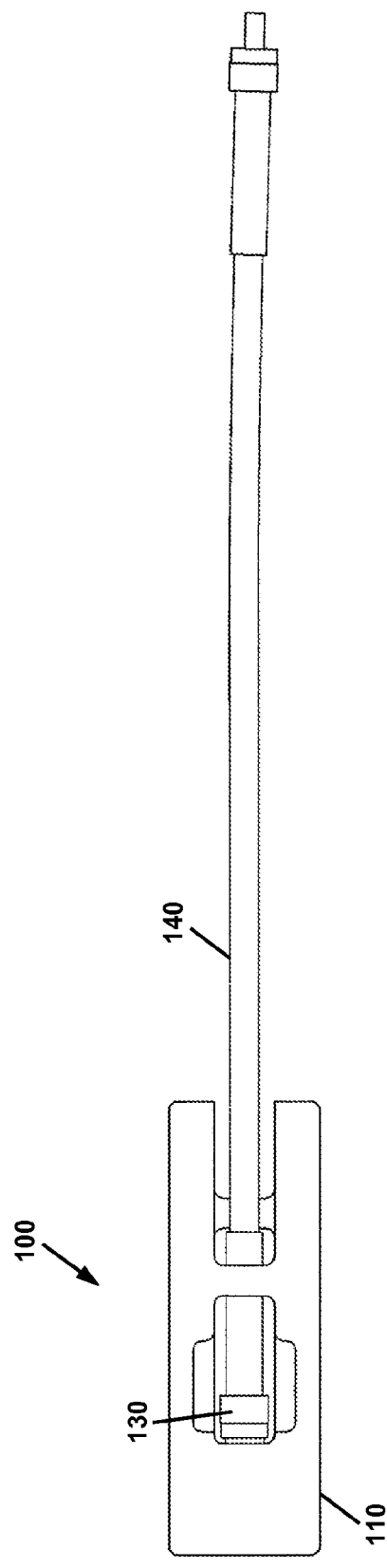

SPECTROMETER FOR MICROSCOPE ILLUMINATION SOURCES

CROSS-REFERENCE TO RELATED PATENT APPLICATIONS

This application claims priority from U.S. Provisional Patent Application No. 61/787,696 filed Mar. 15, 2013, the disclosure of which is incorporated herein by reference.

BACKGROUND

1. Technical Field

Compact devices for characterizing spectral content of illumination sources, and more particularly, a compact spectrometer apparatus for characterizing an illumination source of a microscope.

2. Description of Related Art

Microscope illumination systems are varied in their excitation spectra and/or by the type of illumination method used to illuminate a sample that is under examination. Currently, mercury, metal halide, tungsten, halogen, and xenon lamps, along with lasers and LED's are the most common illumination sources. Each method and illumination source has a unique light spectrum to illuminate the sample for bright field, fluorescence, total internal reflection fluorescence (TIRF), or confocal microscopy. Along with the different spectra and power from the light source, there are multitudes of filters and dichroics that may be used to modify the light. Microscope users need to know that they are getting the proper light to their sample, with regard to both spectrum and power. There are power meters on the market that measure the total power to the sample, but they do not measure the full light spectrum. Knowing the actual light spectrum allows a user to know if he is applying the proper light to his sample.

Light sources can shift and change intensity over time. During an experiment, results can be compromised if the illuminator light output changes. In many circumstances, this occurs without the user being aware of the problem. During a long time-lapse experiment, it is very important for the light to be consistent. There are currently no devices to accurately measure the light output during these experiments.

What is needed is a compact device for measuring the brightness and spectral content of a microscope illumination source that can be used to check the validity of the excitation or transmitted light illumination. Another need is to do this check in real time, and without interfering with the microscopic observation and/or characterization of a sample itself.

SUMMARY

In accordance with the present disclosure, the problem of characterizing a microscope illumination source in real time, and without interfering with the observation and/or characterization of a sample is solved by a spectrometer apparatus comprising a light probe comprising a mirror disposed in a housing, the mirror positioned to reflect light from the illumination source into an optical coupling; an optical waveguide receiving reflected light into the optical coupling; and a spectrometer comprising a light sensor receiving reflected light directed by the optical waveguide from the optical coupling of the light probe, the sensor configured to sense light over a range of wavelengths and output a signal indicative of a property of the light at any wavelength over the range. The property of the light may be the light intensity.

The spectrometer apparatus may further comprise a processor receiving the signal from the sensor and containing an algorithm for calculating at least one parameter of the illumination source. In certain embodiments, the housing may be comprised of a fitting disposable between the illumination source and a microscope. The mirror of the housing is disposed at the edge of the perimeter of the interior of the housing that passes the light from the source, such that most of the light from the illumination source is unobstructed by the light probe and is directed to the microscope. In that manner, continuous real-time characterization of the illumination source can occur without disrupting operation of the microscope and observation of a sample.

In certain embodiments, the housing is disposable upon the stage of a microscope, with the stage being movable so as to position the mirror of the housing to receive light from the illumination source in a first stage position, and to position a sample disposed on the stage to receive light from the illumination source in a second stage position. In that manner, the illumination source can be characterized during sample observation without the need for an operator to physically remove the sample and replace it with the light probe. The light probe may be located at the same plane as a sample under observation. The light probe may have the "footprint," i.e., the shape of a standard microscope slide on the stage.

In accordance with the present disclosure, there is further provided a microscope comprising an illumination source, a stage configured to receive a sample for observation, and a spectrometer apparatus for characterizing the illumination source as disclosed herein.

BRIEF DESCRIPTION OF THE DRAWINGS

The present disclosure will be provided with reference to the following drawings, in which like numerals refer to like elements, and in which:

FIG. 3 is a perspective view of a spectrometer light probe shaped like a standard microscope slide and connected to a fiber optic cable;

FIG. 4 is a perspective cross-sectional view of the light probe and cable of FIG. 3, taken along the line 4-4 of FIG. 3;

FIG. 5 is a side elevation view of the light probe and cable of FIG. 3;

FIG. 6 is a top view of the light probe and cable of FIG. 3, taken along the line 6-6 of FIG. 5;

Figure 1:
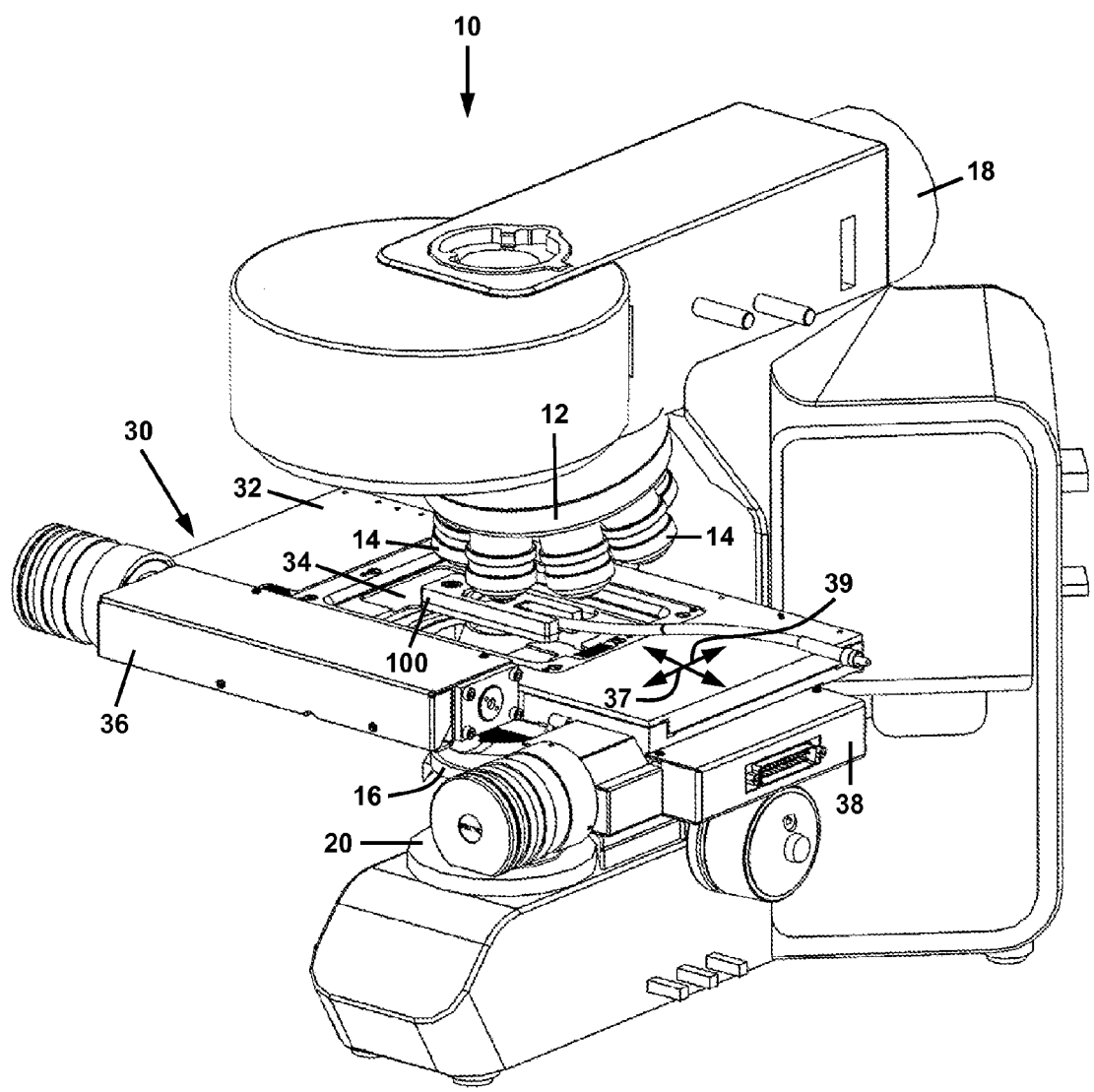
FIG. 1 is a perspective view of a first microscope including a spectrometer light probe disposed on a stage of the microscope and positioned for detecting light received at the sample location from a light source of the microscope.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements. In the following disclosure, the present invention is described in the context of its use as a spectrometer for characterizing an illumination source for a microscope. However, it is not to be construed as being limited only to use in applications pertaining to microscopy. The invention is adaptable to any use in which characterization of an illumination source is desirable to be provided from a compact spectrometer. Additionally, the description may identify certain components with the adjectives "top," "upper," "bottom," "lower," "left," "right," etc. These adjectives are provided in the context of use of the spectrometer and the light receiving probe thereof to characterize illumination sources for microscopy, and in the context of the orientation of the drawings. The description is not to be construed as limiting the spectrometer and the light receiving probes to use in a particular spatial orientation. The instant spectrometer and light receiving probes may be used in orientations other than those shown and described herein.

An "illumination source," as used herein means any source of electromagnetic radiation that is used to illuminate a sample for some purpose. The electromagnetic radiation, i.e., light, may be in the visible spectrum for illuminating a sample under observation on a microscope for the purpose of visually observing the physical appearance and/or structure of the sample. The electromagnetic radiation may be in the non-visible portion of the spectrum, such as in the infrared portion or the ultraviolet portion. The electromagnetic radiation may be ultraviolet or other radiation that is used to cause a chemical reaction in a sample, or used to cause excitation of the sample or some constituent thereof, in order to cause fluorescent emission or some other effect. (In this instance, the illumination source is often referred to as an "excitation source.")

Figure 2:
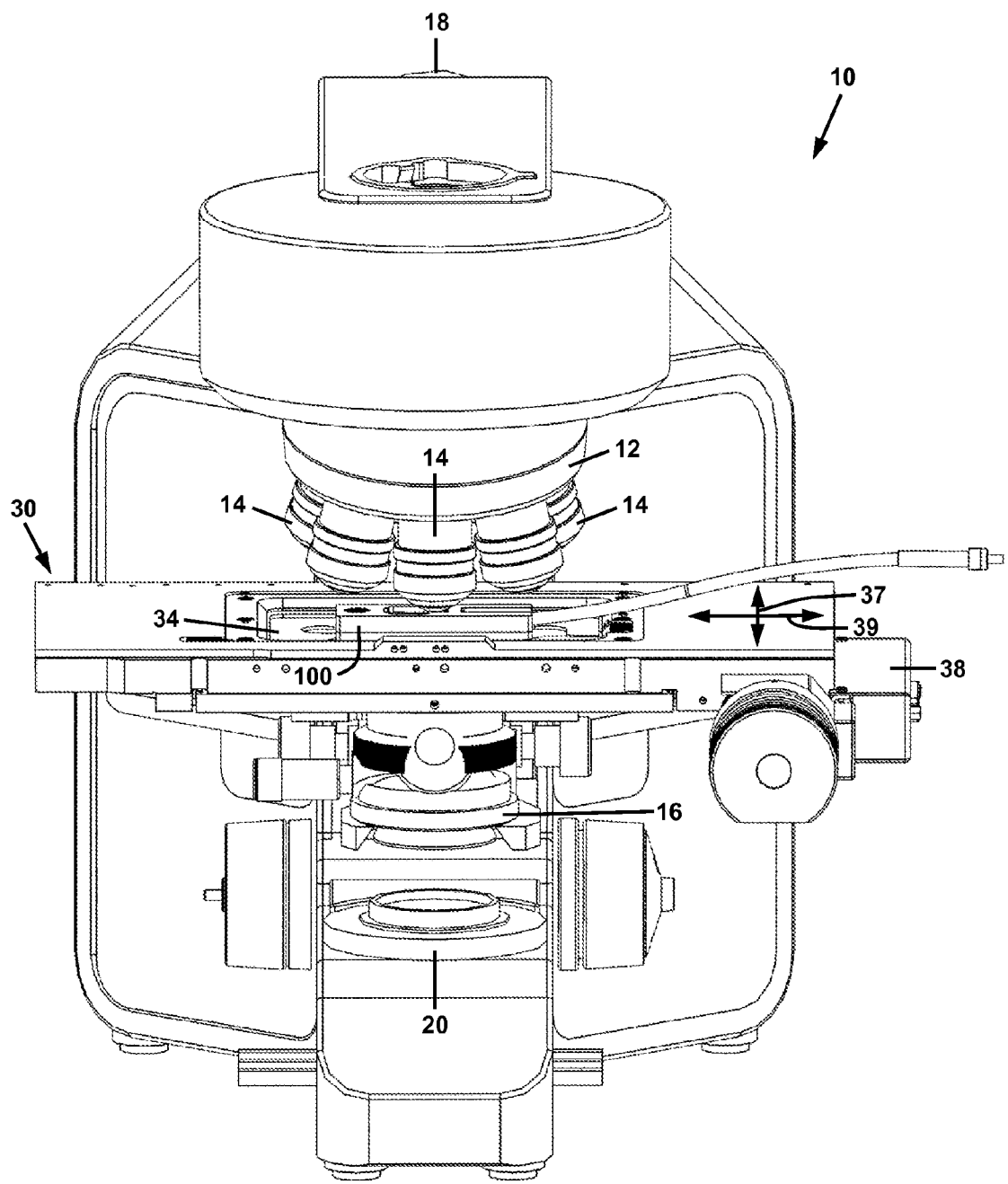
FIG. 2 is a front view of the microscope and light probe of FIG. 1, taken at an oblique angle slightly above horizontal.
Figure 7:
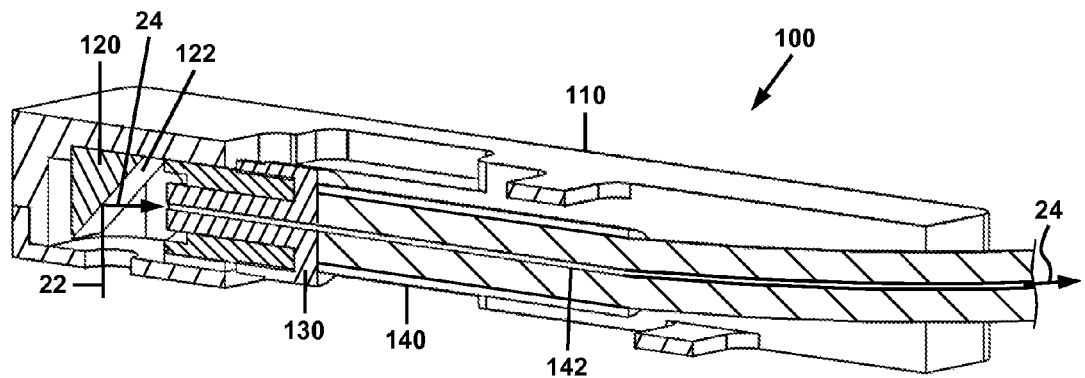
FIG. 7 is a detailed perspective cross-sectional view of the light probe, from the perspective cross-sectional view of the light probe and cable as shown in FIG. 4.
Figure 11:
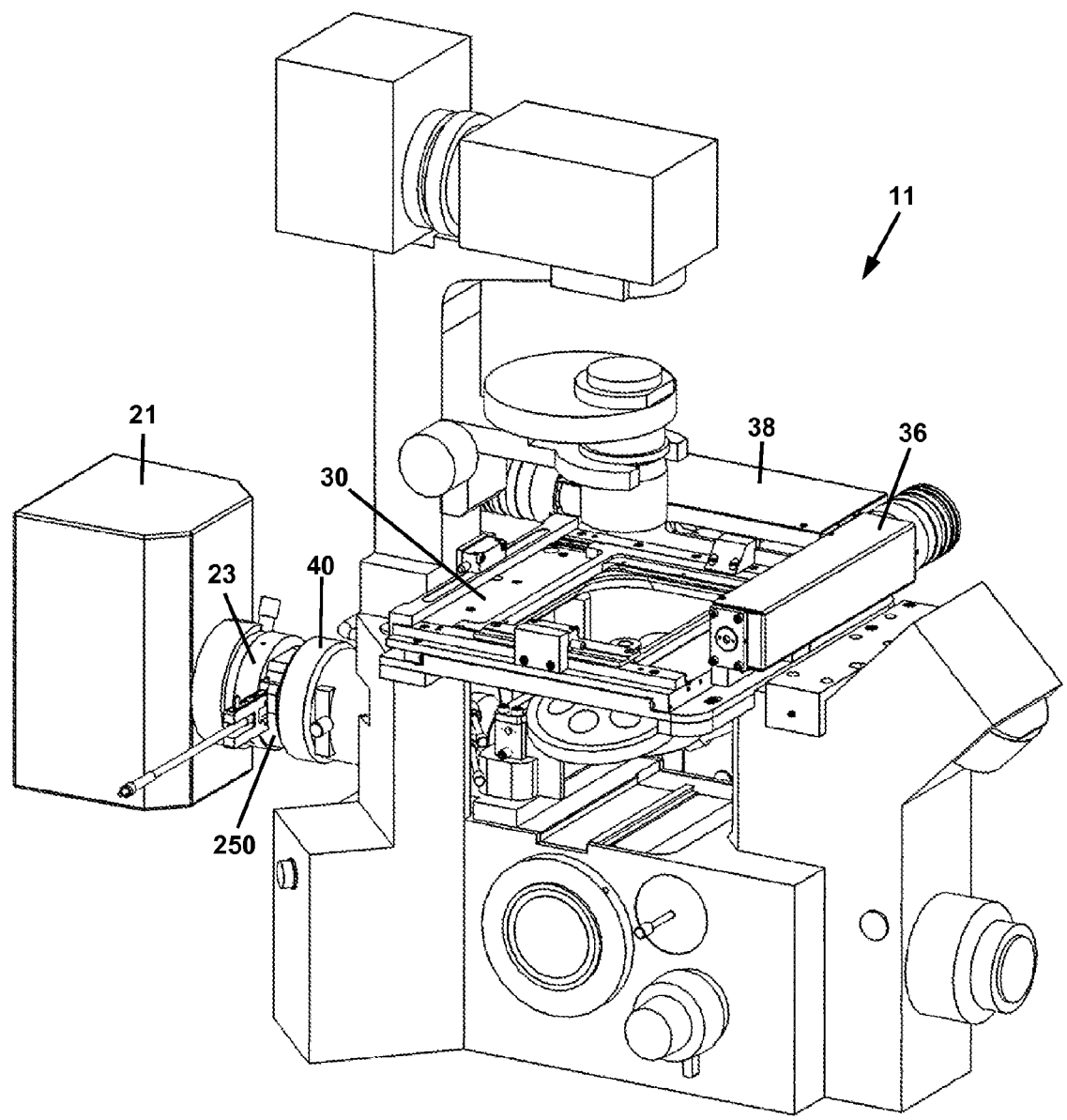
FIG. 11 is a perspective view of a second microscope including a spectrometer light probe disposed in a fitting, connected to a fiber optic cable and positioned for detecting light received from a remotely mounted light source of the microscope.
Figure 12:
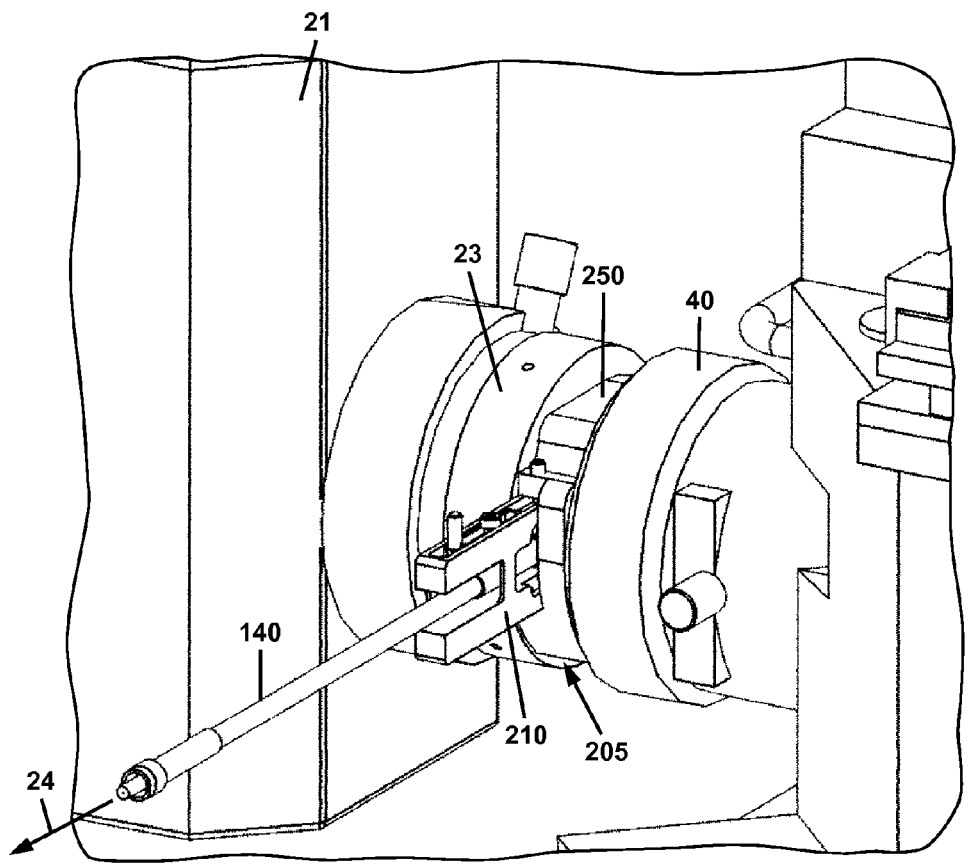
FIG. 12 is a detailed perspective view of the spectrometer light probe disposed in the fitting of FIG. 11.
Figure 13:
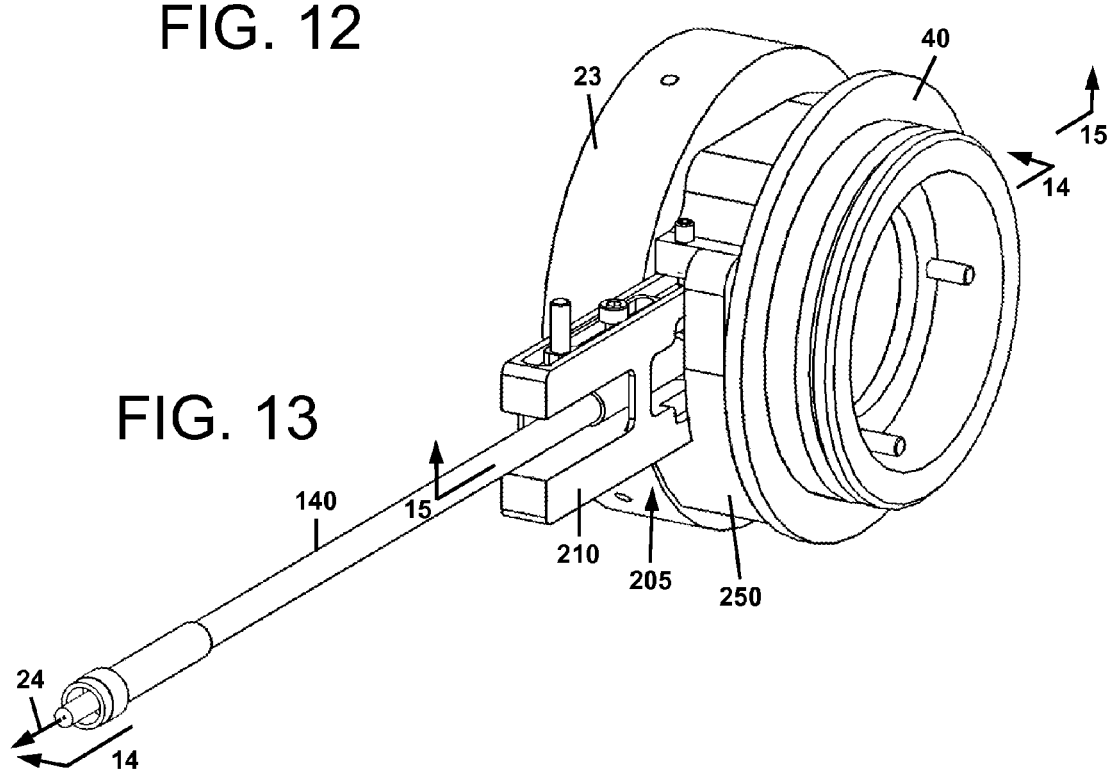
FIG. 13 is a detailed perspective view of the spectrometer light probe, cable, and fitting of FIG. 12, shown separated from the light source and the microscope.
Figure 14:
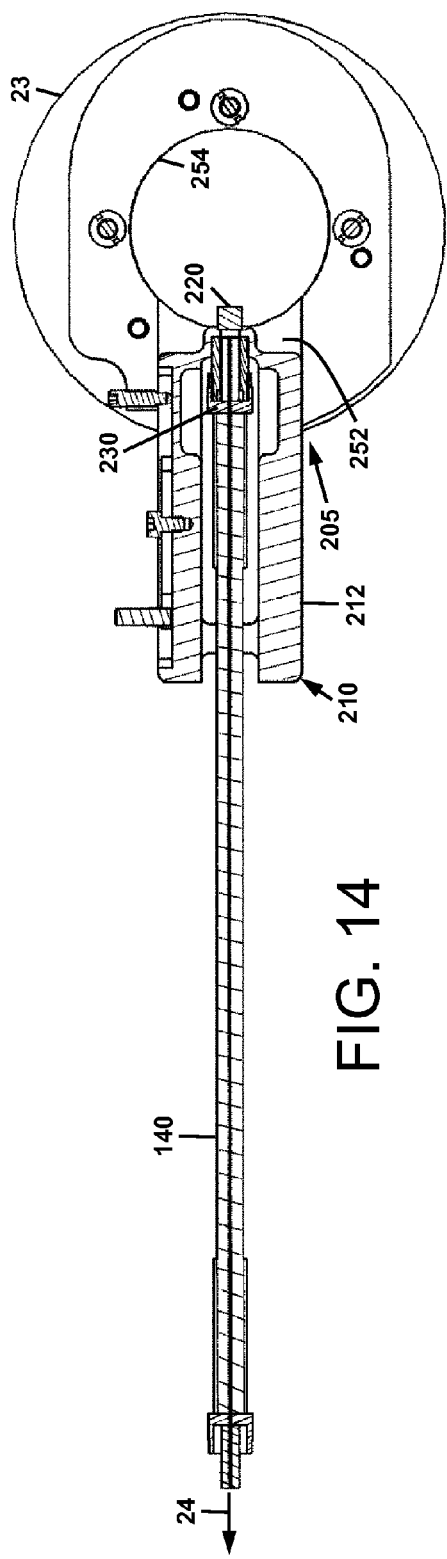
FIG. 14 is an axial cross-sectional view of the spectrometer light probe, cable, and fitting, taken along the line 14-14 of FIG. 13.
Figure 15:
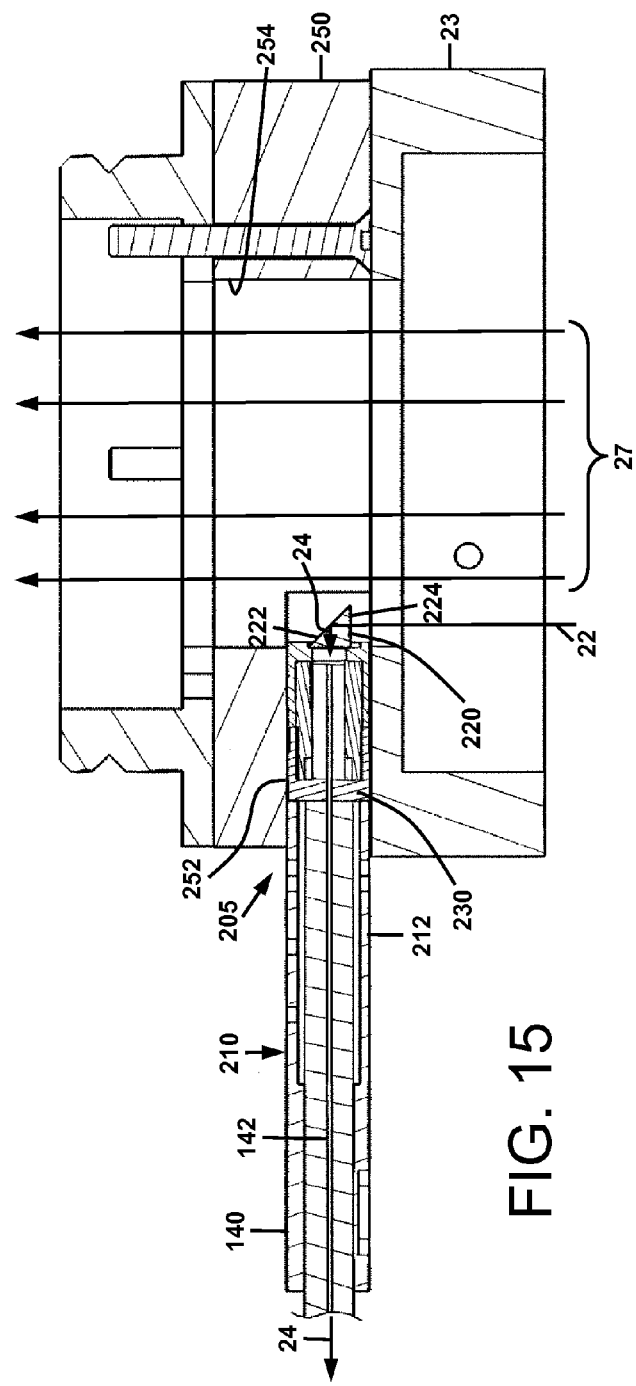
FIG. 15 is a bottom cross-sectional view of the spectrometer light probe and fitting taken along the line 15-15 of FIG. 14.

Turning first to FIGS. 1 and 2, a light probe 100 of the spectrometer apparatus is depicted in use on a microscope 10. The microscope 10 may be comprised of ocular lens(es) or eyepiece(s) (not shown), a turret 12 containing multiple objectives 14 having different levels of magnification, and a diaphragm and condenser lens 16, a coupling 18 for receiving a camera or other imaging device (not shown), and a light source 20. These optical components 12-20 are supported by a rigid framework (concealed beneath various covers). The Applicants' spectrometer apparatus may be used on microscopes having various configurations other than as shown in FIGS. 1 and 2. For example, the microscope may be as depicted in FIG. 11, to be described subsequently herein. The microscope may be an inverted microscope in which the light source and condenser are on the top, above the stage pointing down, while the objectives and turret are below the stage pointing up.

In the region between the objective 14 and the condenser lens 16, there is a focal plane, within which the sample (not shown) to be observed and/or imaged must be positioned. For this purpose, the microscope 10 is further comprised of a stage 30 comprised of an upper plate 32 having an opening 34 for passing light to illuminate the sample. The stage 30 may be further comprised of drives 36 and 38 for moving the upper plate 32 and sample in the horizontal x-y plane of the plate as indicated by bidirectional arrows 37 and 39. The microscope 10 may have a light source that directs light to a sample from above the stage 30, rather than beneath the stage as shown in FIGS. 1 and 2, or from a rearward portion of the microscope 11 as shown in FIG. 11.

In accordance with one aspect of the invention, there is provided a light probe 100 that is disposed on the stage 30 of the microscope 10. It is noted that the front view of the microscope 10 in FIG. 2 is tilted forward at an oblique angle of about 10 degrees, and that the x-axis drive 36 is not shown so that the light probe 100 is visible on stage 30. In operation of the microscope 10, a sample (not shown) may be placed in a sample holder (not shown) on the upper plate 32 of stage 30, and observed with the microscope 10. At a point when it is desirable to characterize the light source 20, the upper plate 32 may be moved by drives 36 and 38 so that light from light source 20 is received by light probe 100. When the characterization of light source 20 is complete at that time, the upper plate 32 may be moved to place the sample under observation again. The process may be repeated during further observation of the sample, or as samples are changed out on the stage 30. Drives 36 and 38 and a sample changing apparatus (not shown) may be controlled by a computer such that all or part of the observation and light source characterization process is automated.

The light probe 100 is comprised a mirror disposed in a housing. The mirror is positioned to reflect light from the illumination source 20 into an optical coupling. An optical waveguide is provided, which receives the reflected light into the optical coupling, and transmits the reflected light to a compact spectrometer as will be described subsequently herein. The housing of the light probe 100 may have various shapes to suit the particular illumination source characterization requirements and the size and configuration of the microscope stage. For example, the housing of the light probe may be shaped like a well plate, a Petri dish, or a microscope slide.

Referring now to FIGS. 3-8, and in certain embodiments depicted therein, the housing 110 of the light probe 100 may be shaped the same, i.e., have the same "footprint" as a standard microscope glass slide used in sample observation. In one embodiment, the length-by-width footprint of the housing 110 is three inches by one inch, which matches the three inch by one inch standard microscope slide shape.

In the light probe 100 of FIGS. 3-8, the mirror is provided as a prism 120 comprised of a reflective face 122, which is positioned to reflect incident light 22 from light source 20 into the optical coupling 130. The mirror may also be a flat reflective body instead of a prism. The optical wave guide is provided as a fiber optic cable 140 joined to the optical coupling 130 and comprising optical fiber 142, which directs reflected light 24 to the spectrometer 150 of FIG. 9. The reflective face 122 of the prism 120 may be provided with a reflective coating such as silver, or another suitable reflective material. In order for the light source 20 to be properly characterized by the instant spectrometer, it is important that the reflective face 122 be specularly reflective, and that it reflects 100 percent of all wavelengths of light across the range of the spectrum that may be output by light source 20.

In an alternative embodiment (not shown), the light probe 100 may be provided without the mirror. In such an embodiment, the optical coupling 130 is positioned in the housing 110, or the optical coupling and/or the optical fiber 142 is positioned in the housing such that light from the microscope light source directly enters the optical fiber and is transmitted to the spectrometer.

Figure 9:
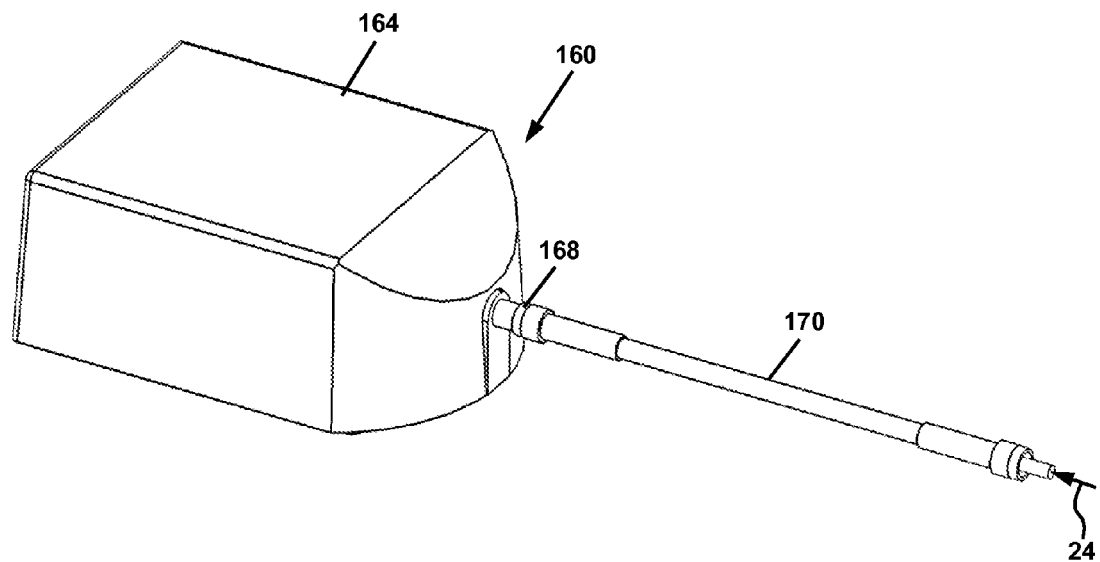
FIG. 9 is a perspective view of a compact spectrometer contained in a housing and connected to a fiber optic cable.
Figure 10:
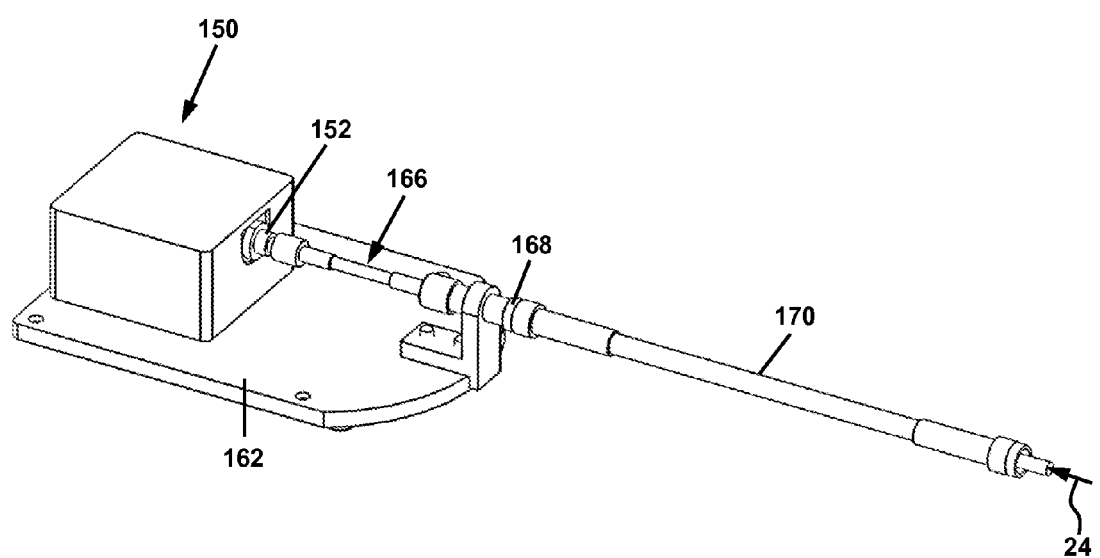
FIG. 10 is a perspective view of the compact spectrometer and fiber optic cable of FIG. 9, but with the housing cover removed therefrom.

Referring now to FIGS. 9 and 10, a spectrometer 150 of the instant spectrometer apparatus is shown. In certain embodiments (not shown), the spectrometer 150 may be mounted directly on the stage 32 of the microscope 10, or on another suitable structure thereof, and the fiber optic cable 140 of the light probe 100 may be connected to a fiber optic port 152 so as to deliver the reflected light 24 from the illumination source 20 to the spectrometer 150. Alternatively, in another embodiment (not shown), the spectrometer may be placed on the microscope stage 30 or another nearby location, with the light 22 from the source 20 being directed into the spectrometer 150 or via a lens or mirror apparatus. In this embodiment, the spectrometer 150 is used without the use of any fiber optic cable.

Figure 16:
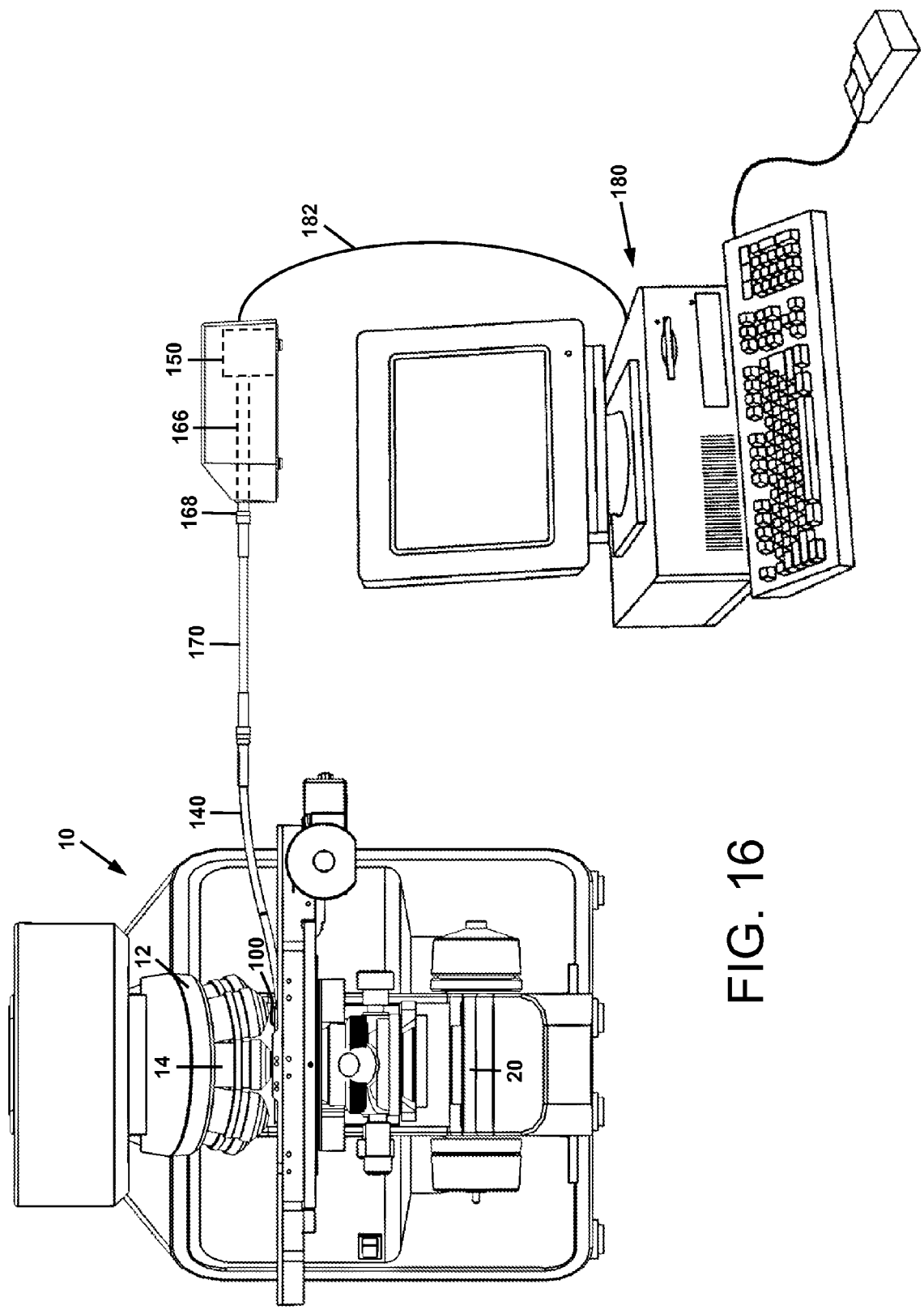
FIG. 16 is a schematic illustration of the microscope and spectrometer apparatus including the spectrometer light probe of FIGS. 1-8 shown connected to the spectrometer of FIGS. 9 and 10, with the spectrometer in signal communication with a computer.

In the embodiment depicted in FIGS. 9 and 10, the spectrometer 150 is contained in a housing 160 that includes a base 162 and a cover 164. A fiber optic connector assembly 166 is mounted on the base 162 and coupled to the fiber optic port 152 of the spectrometer 150. The connector assembly 166 is comprised of a coupling 168 that is connectable to a fiber optic cable 170, which in turn may be connected to the fiber optic cable 140 of the sample probe 100 of FIGS. 3-8, as also shown in FIG. 16. Alternatively, the fiber optic cable 140 of the sample probe 100 may be connected directly to the spectrometer connector assembly 166.

In certain embodiments, the spectrometer may be a grating type spectrometer wherein the light 24 from the source 20 is passed through a slit (not shown) and is reflected off of a grating (not shown) and shifted into the full spectrum (which may be between 350 to 800 nm in wavelength) and collected onto a sensor (not shown). The sensor may be calibrated against a standard known light source (not shown) in order to remove any irregularities in the sensor and the grating.

In certain embodiments, the spectrometer 150 may be a commercially manufactured spectrometer, such as a spectrometer made by B&W Tek, Inc. of Newark, Del., StellarNet Inc. of Tampa, Fla., or Ocean Optics, Inc. of Dunedin, Fla. The spectrometer 150 may include a USB or other type of data transfer connection (such as a wireless data connection) or cable 182 to enable the data from the spectrometer 150 to be transferred to a monitor or computer 180 as shown in FIG. 16.

The spectrometer 150 includes a light sensor (not shown) that senses the reflected light 24 from the source 20 over a range of wavelengths and outputs a signal indicative of the intensity of the light at any wavelength over the range. Accordingly, the spectrometer 150 may be used to measure the power at each wavelength. The spectrometer 150 may include a processor (not shown) that receives the signal from the sensor and contains an algorithm for calculating at least one parameter of the illumination source, such as the power at each wavelength. The algorithms may include instructions to display a spectral graph of the illumination source 20 showing the power at each wavelength, and/or instructions to calculate the total power from the illumination source 20 or the power from a variety of user selected ranges. Alternatively, the processor may be external to the spectrometer 150 and in communication therewith, such as computer 180 shown in FIG. 16 in communication with spectrometer 150.

In an alternative embodiment, the spectrometer may be incorporated directly into a housing that may be disposed on the stage 30 of the microscope 10 (FIG. 1) in the sample observation area. In that manner, the light from the microscope light source is transmitted directly into the spectrometer, without the need for a light probe 100, and fiber optic cable 140 and 170.

In accordance with another aspect of the invention, there is provided a light probe for in situ measurement of an illumination source with the instant spectrometer system. In this application, the light probe is placed in the light path of the microscope. The probe may be disposed at any point in the light path including, but not limited to, at the neutral density filter slider, or at the contrast slider (i.e., just beneath the objective nosepiece). Software algorithms performed by the processor of the spectrometer system may then acquire continuous readings of the light spectrum and store them for the user to review upon completion of observations with the microscope and/or the algorithms may perform analyses of the spectral data as described above.

FIGS. 11-15 depict one exemplary embodiment of a light probe for in situ measurement of an illumination source in accordance with the invention. In the embodiment depicted in FIGS. 11-15, the illumination source 21 is coupled to the lower rearward portion of the microscope 11, and used to illuminate a sample (not shown) on the microscope stage 30. The microscope 11 is comprised of a coupling 40 that is connectable to a corresponding coupling 23 of illumination source 21.

The light probe 200 is comprised of a housing 205 comprising a first portion 210 received by a fitting 250. The fitting 250 is disposed between the illumination source 21 and the microscope 11. The fitting 250 may be provided with features (not shown) for direct connection to coupling 40 of the microscope and coupling 23 of illumination source 21. In the embodiment of FIGS. 11-15, the first housing portion 205 is similar to housing 110 of FIGS. 3-8, and is comprised of a housing body 212, which holds a prism 220 and an optical coupling 230. The optical coupling 230 is connectable to a fiber optic cable 140, which in turn is connectable to the spectrometer 150 of FIGS. 8, 9, and 16.

The prism 220 is held by the housing body 212 at the distal end thereof. The prism 220 is comprised of reflective facet 222, which functions as a mirror. A cavity 252 in the fitting 250 receives the housing body 212 and holds it in a fixed position within a passageway 254 through the fitting 250. In the in situ operation of the spectrometer system, i.e., simultaneously while operation of the microscope 11 is occurring, the housing body 212 is inserted into the cavity 252 of the fitting 250, just sufficiently for the prism 220 to receive light 22 sampled from the illumination source 21. The vast majority 27 of the light from the source 21 does not impinge upon the prism 220, and instead passes through the passageway 254 of the fitting 250, and is directed by a mirror (not shown) upwardly to the stage 30 of the microscope 11, where it illuminates/excites a sample (not shown). In that manner, the presence of the light probe 200 has no effect on microscope operation while the illumination source 21 is characterized by the spectrometer system.

Figure 8:
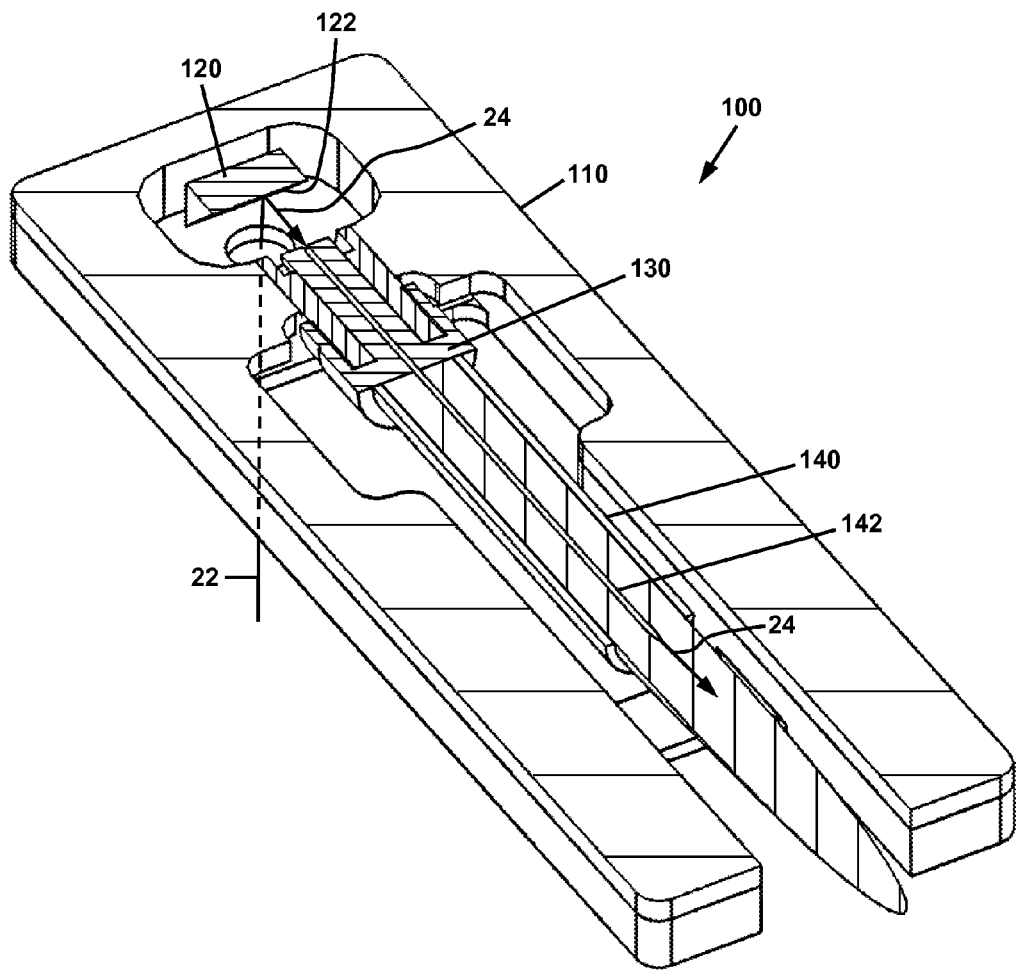
FIG. 8 is a top perspective cross-sectional view of the light probe of FIG. 3.

Sampled light 22 passes through a perpendicular facet 224, and is reflected 24 internally into optical coupling 230, where it is directed into fiber optic cable 140, and delivered to spectrometer 150 of FIGS. 8, 9, and 16, in the same manner as described previously. Characterization of the light 24 from the source 21 then proceeds, also as described previously. In that manner, the user of the microscope 11 can get continuous data to ensure that the light 27 of the illumination source 21 is not changing during an experiment or observation of a sample.

Figure 17:
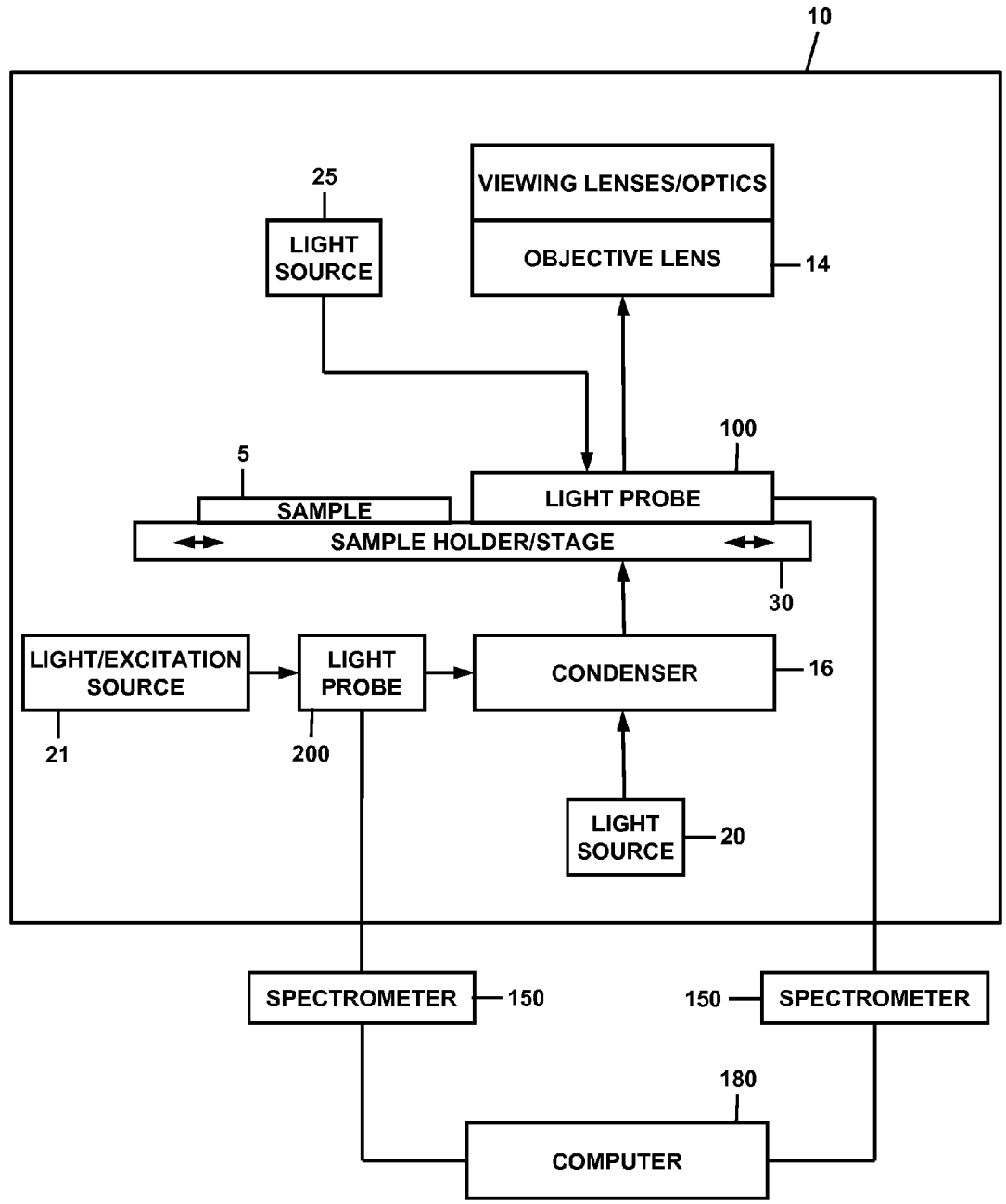
FIG. 17 is a block diagram of embodiments of the Applicants' spectrometer apparatus including light probes and spectrometers in use with microscopes and in communication with a computer.

FIG. 17 is a block diagram of embodiments of the Applicants' spectrometer apparatus including various possible configurations of light probes and spectrometers in use with microscopes and in communication with a computer. The microscope may include a lower on-axis light source 20 or a rearward light source 21. The spectrometer system may include a light probe 100 disposed on the microscope stage 30, or a light probe 200 disposed between a light source such as light source 21 and the other components of the microscope 10. An alternative light source 25 may be disposed above the stage 30, and may illuminate the sample 5 from above. In such a configuration, the light probe 100 would need to be inverted so that the reflective surface 122 of the prism 120 faces upwardly in order to receive and reflect light from light source 25 to the spectrometer 150.

It is, therefore, apparent that there has been provided, in accordance with the present invention, a spectrometer for characterizing an illumination source. Having thus described the basic concept of the invention, it will be rather apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims.

What is claimed is:

1. A spectrometer apparatus for characterizing an illumination source, the spectrometer apparatus comprising:
    a) a light probe comprising a mirror disposed in a housing, the mirror positioned to reflect light from the illumination source into an optical coupling;
    b) an optical waveguide receiving reflected light into the optical coupling; and
    c) a spectrometer comprising a light sensor receiving reflected light directed by the optical waveguide from the optical coupling of the light probe, the sensor configured to sense light over a range of wavelengths and output a signal indicative of a property of the light at any wavelength over the range;
    wherein the housing is disposable upon the stage of a microscope, and the stage is movable so as to position the mirror of the housing to receive light from an illumination source in a first stage position, and to position a sample disposed on the stage to receive light from the illumination source in a second stage position.

2. The spectrometer apparatus of claim 1, further comprising a processor receiving the signal and containing an algorithm for calculating at least one parameter of the illumination source.

3. The spectrometer apparatus of claim 1, wherein the housing of the light probe has the shape of a standard microscope slide on the stage.

4. The spectrometer apparatus of claim 1, wherein the housing of the light probe is formed in the shape of a Petri dish.

5. The spectrometer apparatus of claim 1, wherein the housing of the light probe is formed in the shape of a well plate.

6. The spectrometer apparatus of claim 1, wherein the property of the light is the intensity of the light.

7. A microscope comprising an illumination source, a stage configured to receive a sample for observation, and a spectrometer apparatus for characterizing the illumination source, the spectrometer apparatus comprising:
    a) a light probe comprising a mirror disposed in a housing, the mirror positioned to reflect light from the illumination source into an optical coupling;
    b) an optical waveguide receiving reflected light into the optical coupling; and
    c) a spectrometer comprising a light sensor receiving reflected light directed by the optical waveguide from the optical coupling of the light probe, the sensor configured to sense light over a range of wavelengths and output a signal indicative of a property of the light at any wavelength over the range;
    wherein the housing is disposed upon the stage of the microscope, and the stage is movable so as to position the mirror of the housing to receive light from the illumination source in a first stage position, and to position a sample disposed on the stage to receive light from the illumination source in a second stage position.

8. The microscope of claim 7, wherein the light probe is coplanar with the sample disposed on the stage.

* * * * *